(12) United States Patent
Chalk

(10) Patent No.: US 6,912,971 B1
(45) Date of Patent: Jul. 5, 2005

(54) VALVE ARRANGEMENT AND ASSEMBLY FOR DISPENSING A LIQUID FROM A CONTAINER TO AN ANIMAL

(75) Inventor: Edwin Albert James Chalk, Abbots Langley (GB)

(73) Assignee: Aquaflow Laboratory Products Limited, (GB)

(*) Notice: Subject to any disclaimer, the term of this patent is extended or adjusted under 35 U.S.C. 154(b) by 0 days.

(21) Appl. No.: 10/606,307

(22) Filed: Jun. 25, 2003

(30) Foreign Application Priority Data

Nov. 6, 2002 (GB) .................................. 0225841

(51) Int. Cl.⁷ ............................................. A01K 7/00
(52) U.S. Cl. ..................................... 119/72.5; 119/477
(58) Field of Search .............................. 119/72.5, 476, 119/496, 464, 477

(56) References Cited

U.S. PATENT DOCUMENTS

| | | | |
|---|---|---|---|
| 3,645,234 A * | 2/1972 | Schroer ....................... 119/477 |
| 3,958,535 A * | 5/1976 | Salvia ......................... 119/72.5 |
| 3,965,864 A | 6/1976 | Beltz |
| 4,006,716 A | 2/1977 | Cross |
| 4,022,159 A | 5/1977 | Salvia |
| 4,130,088 A | 12/1978 | Salvia |
| 4,819,585 A * | 4/1989 | Dolan et al. ................ 119/72.5 |
| 5,065,700 A * | 11/1991 | Cross ......................... 119/72.5 |
| 5,131,622 A * | 7/1992 | Chang ........................... 251/43 |
| 5,163,923 A * | 11/1992 | Donawick et al. .......... 604/257 |
| 5,331,920 A * | 7/1994 | Coiro et al. ................. 119/418 |
| 5,816,194 A * | 10/1998 | Huff ........................... 119/72.5 |
| 5,884,583 A * | 3/1999 | Johnston et al. .............. 119/72 |
| 6,058,881 A * | 5/2000 | Thompson ................... 119/72.5 |
| 6,339,998 B1 * | 1/2002 | Niki et al. ................... 119/72.5 |
| 6,739,283 B1 * | 5/2004 | Lin ............................. 119/72.5 |
| 6,748,899 B1 * | 6/2004 | Momont et al. ............ 119/72.5 |

FOREIGN PATENT DOCUMENTS

GB        2200726 A  *  8/1988   .......... A01K 39/02
WO     WO 03033396      4/2003

OTHER PUBLICATIONS

United Kingdon Search Report Sep. 25, 2003.

* cited by examiner

*Primary Examiner*—Robert P. Swiatek
(74) *Attorney, Agent, or Firm*—Ira S. Dorman

(57) ABSTRACT

An assembly (2) for dispensing a liquid (4) from a container (6, 54, 58) to the mouth (8) of an animal, on demand of the animal. The assembly comprises a sealed container at least partially filled with the liquid and a valve arrangement (22). The valve arrangement comprises a first tube portion (24) adapted to pierce a portion (14) of the container to receive the liquid from the container, a second tube portion (28) adapted with an end to be used by the animal, and a valve adapted to be actuated by the animal to permit the flow of the liquid from the container to the end of the second tube portion.

19 Claims, 5 Drawing Sheets

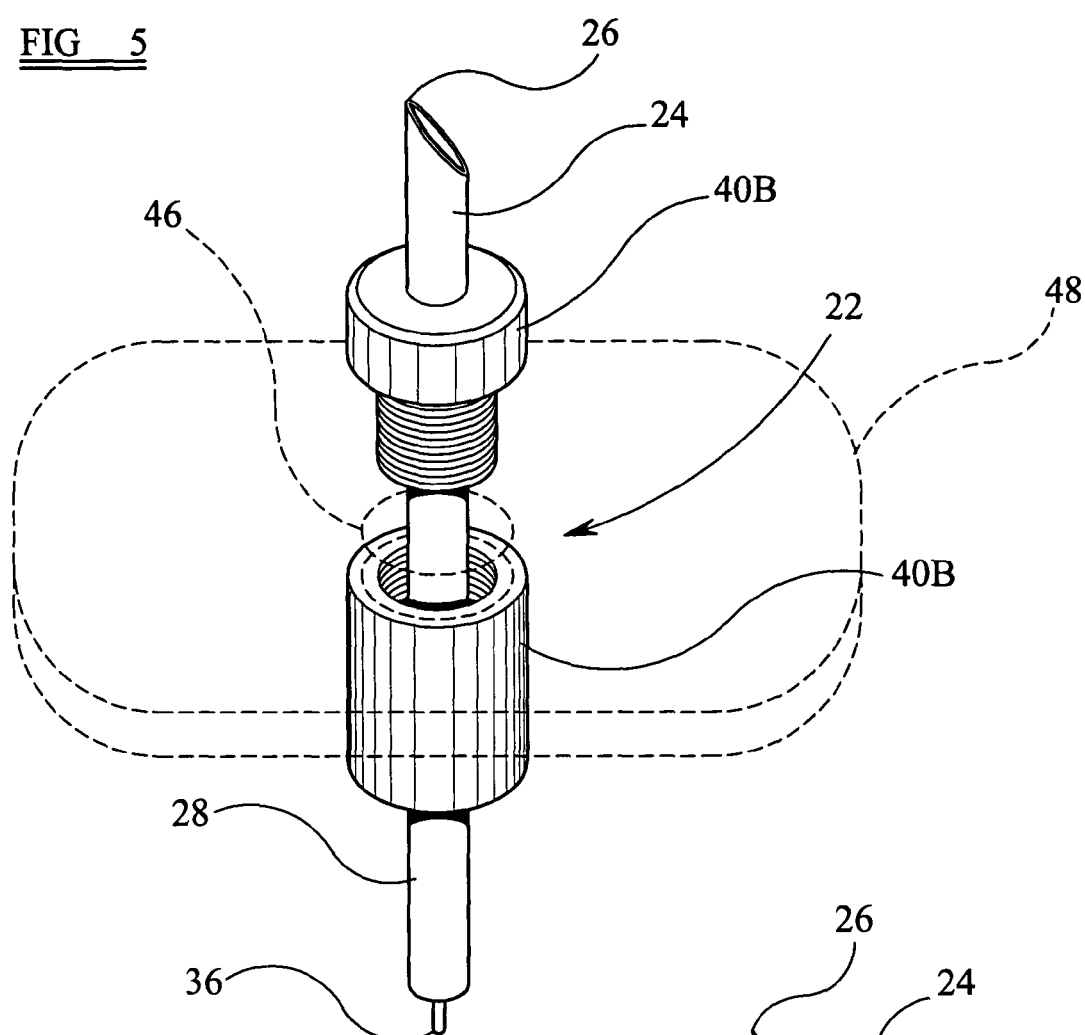
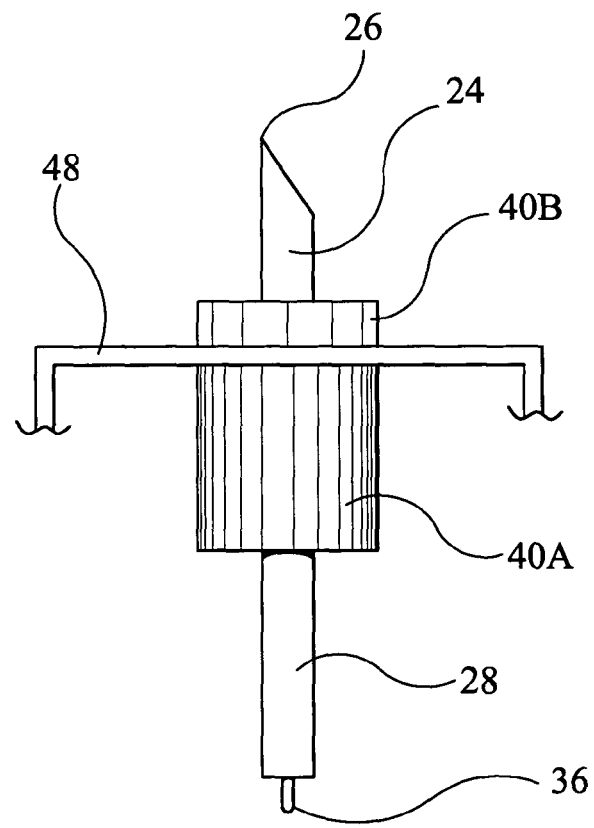

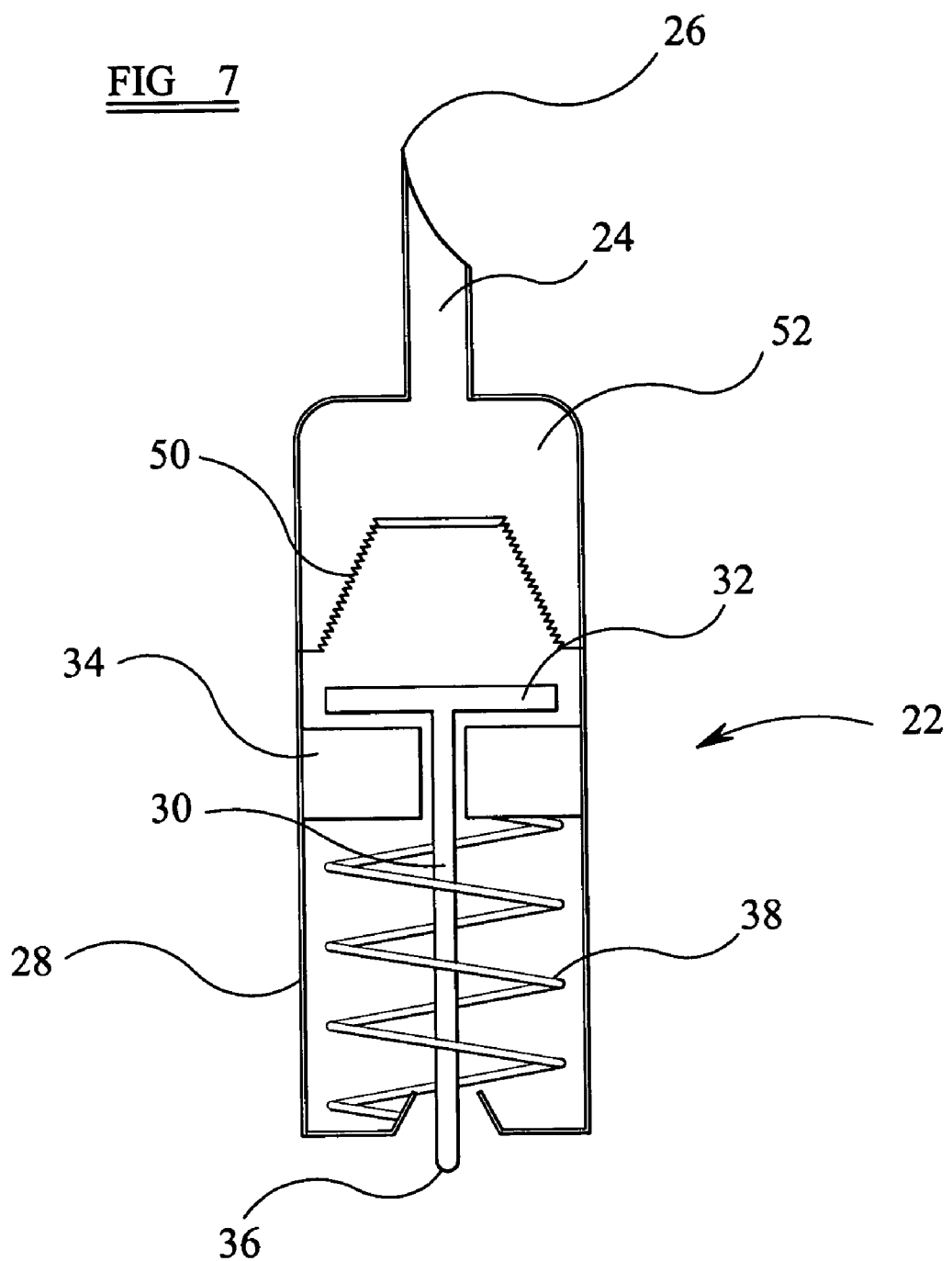

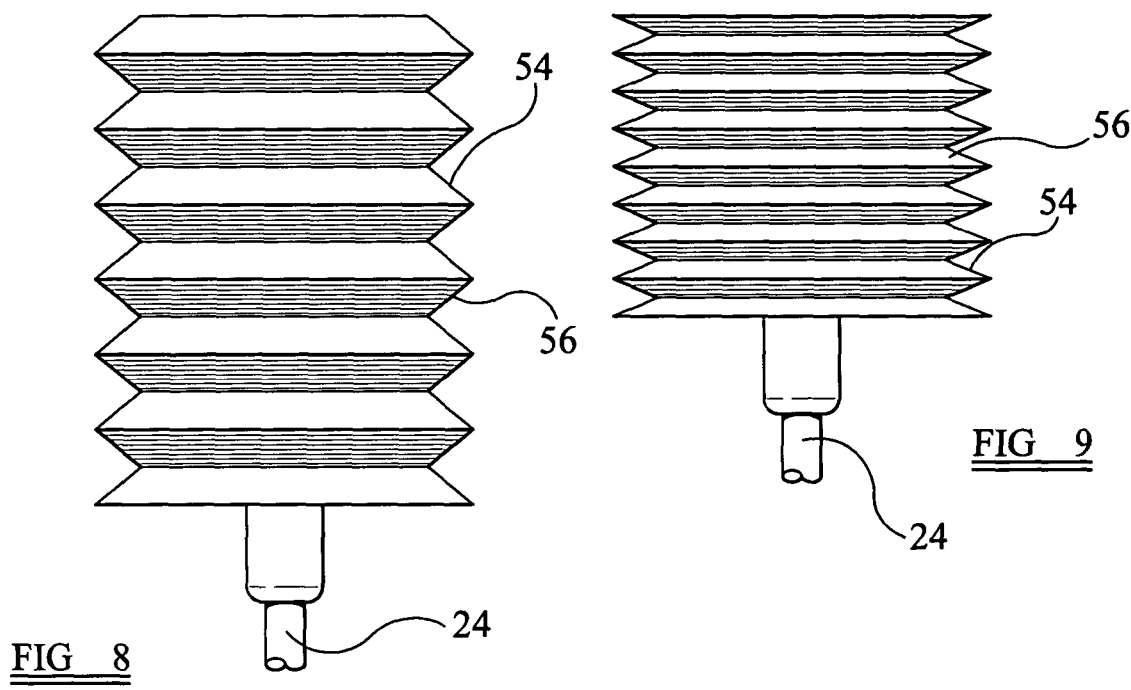
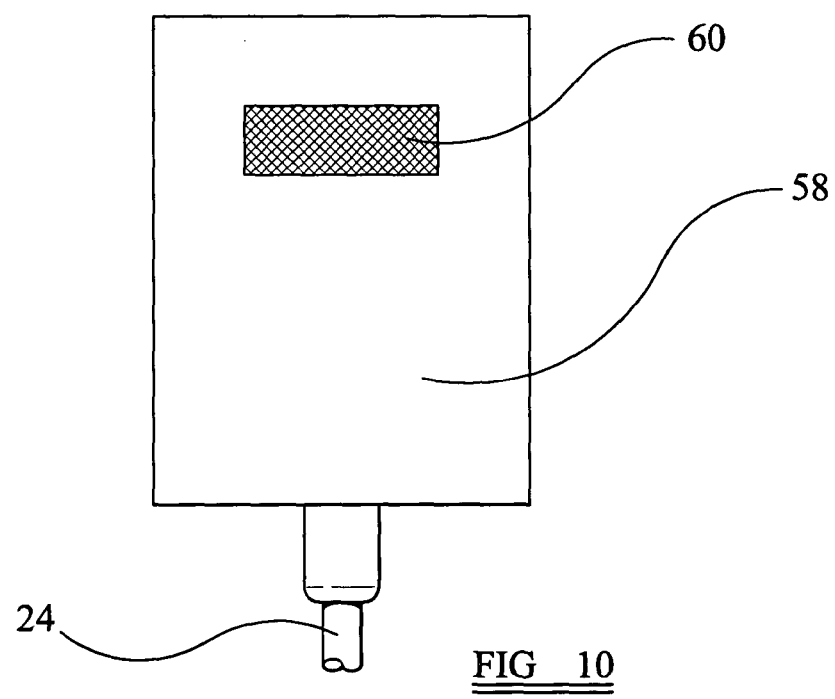

VALVE ARRANGEMENT AND ASSEMBLY FOR DISPENSING A LIQUID FROM A CONTAINER TO AN ANIMAL

This invention relates to a valve arrangement for fitting to a container enclosing a liquid, for dispensing the liquid from the container to a mouth of an animal, on demand of the animal. The invention also relates to an assembly of such a valve arrangement and container.

FIELD OF THE INVENTION

The invention is particularly, but not exclusively, applicable to a valve arrangement and assembly for supplying water, or other liquid, to a laboratory animal, such as a rabbit, primate, mouse or rat, in a cage.

DESCRIPTION OF PRIOR ART

It is known to supply caged animals in a laboratory with water provided in an inverted bottle fitted with a metal spout. As water is drawn by the animal from the bottle, a vacuum forms inside the bottle. When such a vacuum becomes great enough, air is drawn into the bottle through the spout to relieve the vacuum. However, such indrawn air is also accompanied by residual water in the spout which has been in contact with the mouth of the animal. Such air and water also contain micro-organisms and food debris from the mouth of the animal, which rapidly contaminate the water, rendering it unfit for the animal to drink. As a result, the entire assembly has to be regularly cleaned, sterilised and replenished, for example twice a week.

Although the cleaning procedure can be mechanised, it is expensive, being wasteful of water and also involving the use of corrosive and aggressive chemicals and steam sterilising equipment.

It is also known to provide automated watering systems in which water is piped around a building to valves provided in the cages. However, flow rates are very slow and the water is readily contaminated unless flushed away. This is very wasteful of water.

OBJECT OF THE INVENTION

It is an object of the present invention to overcome or minimise this problem.

SUMMARY OF THE INVENTION

According to one aspect of the present invention there is provided a valve arrangement adapted to be fitted to a container at least partially filled with a liquid, for dispensing the liquid from the container to a mouth of an animal on demand of the animal, the valve arrangement comprising a first tube portion adapted to pierce a portion of the container to receive the liquid from the container, a second tube portion provided with an end adapted to be used by the animal, and a valve means adapted to be actuated by the animal to permit the flow of the liquid from the container to the end of the second tube portion.

According to another aspect of the present invention there is provided an assembly for dispensing a liquid from a container to a mouth of an animal, on demand of the animal, the assembly comprising a sealed container at least partially filled with the liquid and a valve arrangement fitted thereto, the valve arrangement comprising a first tube portion piercing a portion of the container to receive the liquid from the container, a second tube portion provided with an end adapted to be used by the animal, and a valve means adapted to be actuated by the animal to permit the flow of the liquid from the container to the end of the second tube portion.

The container may be of rigid form and may comprise a filtered vent, for example a Hepa filter, to relieve a vacuum created as the liquid is dispensed therefrom to the animal.

The container may be arranged to collapse under atmospheric pressure as the liquid is dispensed therefrom to the animal. For example the container may comprise a rigid material provided with a collapsable pleated surface or alternatively the container may be of bag-form comprising a flexible material.

The container may comprise a non-toxic material, for example selected from a plastics material, rubber, treated paper and cardboard, cloth and fibre materials.

The container may be hermetically sealed.

The container may be provided within an outer wrapping to maintain sterility of the container prior to use.

The container may comprise a material which is selected so as to be capable of being sterilised such as by means of steam or by subjecting the container to radiation, such as gamma radiation.

The container may be provided with means for suspending it from suitable support means. Such means for suspending the container may comprise one or more sealed apertures therethrough, which may be provided at an opposite end of the container to the seal means pierced, or adapted to be pierced, by the first tube portion of the valve arrangement.

The portion of the container pierced by the first tube portion of the valve arrangement is arranged to be pierced without leakage of the liquid occurring between the portion of the container and an exterior of the first tube portion, the first tube portion forming a water-tight fit in the pierced portion of the container.

The portion of the sealed container pierced by the first tube portion may be a seal means.

The seal means of the container pierced, or adapted to be pierced, by the first tube portion of the valve arrangement, may comprise a membrane or septum which may be arranged in a connecting tube extending from the container and may be covered by a removable cap until access thereto for piercing is required.

The first tube portion of the valve arrangement may have an end thereof shaped to form one or more sharply angled or pointed regions, which sharply angled or pointed regions facilitate piercing of the portion of the container by the first tube portion.

The first tube portion may be coaxial with, or disposed at an angle to, the second tube portion of the valve arrangement.

The valve arrangement, or at least one of the first and second tube portions thereof, may be dimensioned according to size and/or drinking requirements, such as rate of flow or volume of the liquid, of the animal by which it is to be used.

The first and second tube portions of the valve arrangement may be formed as an integral unit, or the first and second tube portions may be formed separately and assembled together, such as by threaded engagement.

The valve arrangement may be adapted to be secured directly or indirectly to a structure, such as a cage, associated with the animal. Such securing may be by one or more clips, ferrules, threaded caps, grommets and washers and/or by way of a bracket or cradle.

Alternatively, the valve arrangement may be arranged to be fitted to the container and the container arranged to be secured to the structure.

A finger grip arrangement may be provided on the valve arrangement to facilitate fitting of the valve arrangement to the container. The finger grip arrangement may be concentrically arranged on the valve arrangement and may comprise two threadedly-engaging portions which may be positioned one at each side of a support. Such support may be a portion of a cage for containing the animal, or a bracket or cradle such as for securing to a cage for containing the animal.

The valve means of the valve arrangement may comprise a pin having a head portion engaging an apertured seal, and a spring applying force to maintain engagement of the head portion of the spring with the apertured seal, the pin having an end extending from the second tube portion of the valve means and adapted to be contacted by the animal to raise the head portion from the seal against force of the spring to permit flow of the liquid through the valve arrangement from the container.

Alternatively the valve means of the valve arrangement may comprise a non-return valve actuated by the animal and adapted to permit flow of the liquid through the valve arrangement from the container towards the animal but to prevent any flow of the liquid from the animal to the container.

The first and second tube portions of the valve arrangement may comprise metal, such as stainless steel, or plastics material.

The liquid in the sealed container may be water, which may be sterilised water, or may be a treatment liquid such as comprising medication or experimental test material.

The animal may be a laboratory animal or other domestic animal.

By means of the present invention, liquid such as water is supplied from the sealed container to the animal on demand, with minimal risk of back-contamination of remaining liquid in the container. This is achieved by means of the sealed container and the associated valve arrangement with its container-piercing facility. Collapsing of a flexible container under atmospheric pressure, or filter venting of a rigid container, as the liquid is withdrawn therefrom prevents formation of a vacuum inside the container and minimises any tendency for air and contaminants to be drawn back into the container.

For a better understanding of the present invention and to show more clearly how it may be carried into effect, reference will now be made by way of example to the accompanying drawings in which:

BRIEF DESCRIPTION OF THE DRAWINGS

FIG. 5 is a perspective view of a disassembled alternative embodiment of the valve arrangement of FIG. 1, for securing in an aperture in a support;

FIG. 6 is a side view of the embodiment of the valve arrangement of FIG. 5, after assembly in the aperture in the support;

FIG. 7 is a cross-sectional view of a further embodiment of valve arrangement according to the present invention;

FIG. 8 is a side view of an alternative embodiment of a container according to the present invention in a first configuration;

FIG. 9 is a side view of the container of FIG. 8 in a second configuration; and

FIG. 10 is a side view of a further embodiment of a container according to the present invention.

DESCRIPTION OF PREFERRED EMBODIMENTS

Figure 1:
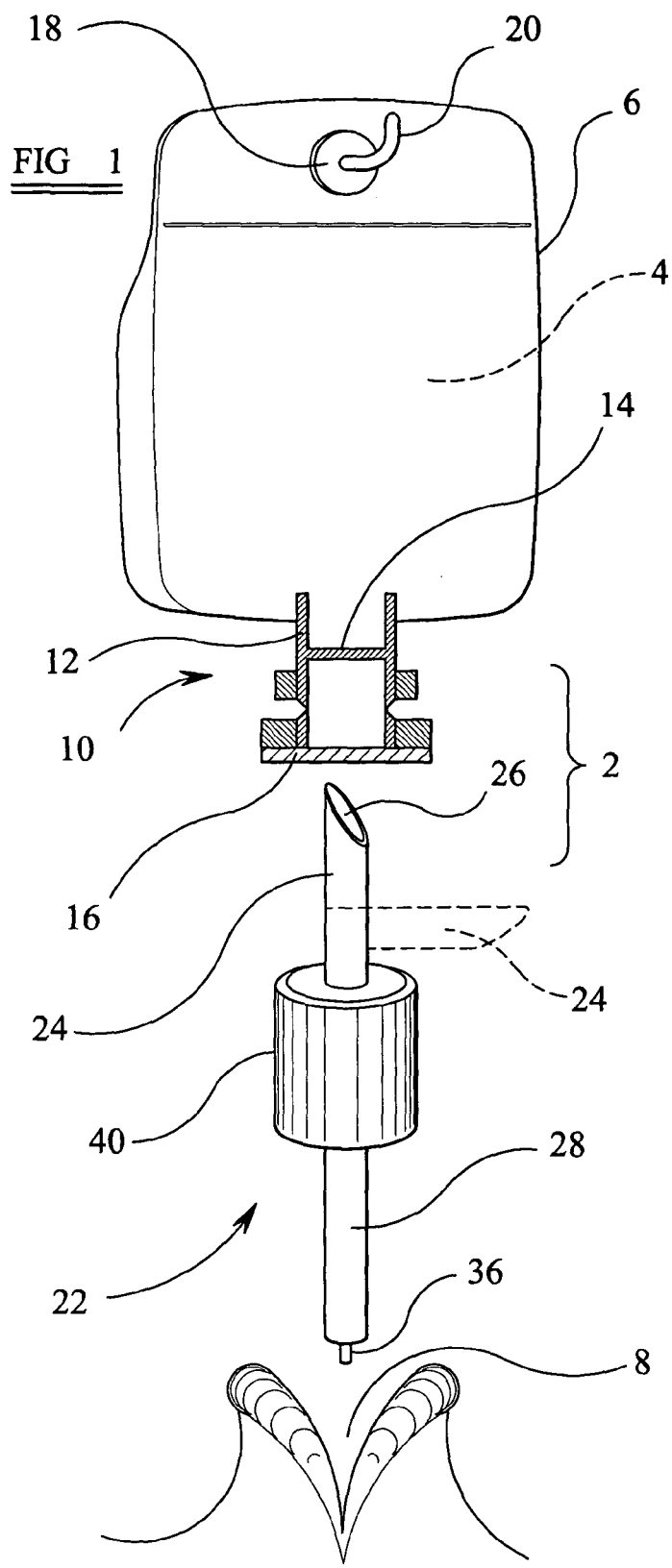
FIG. 1 is a perspective view of a container with liquid, and a valve arrangement, according to the present invention, prior to assembly.

Referring to FIG. 1, an assembly 2 is provided for dispensing a liquid 4, such as sterilised water or a treatment liquid such as comprising medication or experimental test material, from a container 6 to a mouth 8 of an animal, on demand of the animal. The animal may be in a cage in a laboratory. The container 6 is sealed and is of bag-form. It is formed of very flexible plastics material and such that as liquid 4 is removed therefrom, the container collapses under atmospheric pressure. The container 6 is suitably of a form such as is known to be used for enclosing fluids for medical applications and the plastics material from which it is made is suitably selected so as to be capable of being sterilised, for example by means of steam or by subjection to radiation such as gamma radiation.

The container 6 may be provided within an outer wrapping (not shown) to maintain sterility of the container prior to use.

A seal means 10 is provided on the bag-form container 6 and comprises a plastics connecting tube 12 incorporating a thin plastics membrane or septum 14. The end of the connecting tube is covered by a cap 16, which can be removed by subjecting it to a twisting motion.

The container 6 has one or more sealed apertures 18 through it at an opposite end to the seal means 10, to enable the container 6 to be suspended from a support means 20.

A valve arrangement 22 is provided comprising a first tube portion 24 having an end shaped to form one or more sharply angled or pointed regions 26. The valve arrangement 22 has a second tube portion 28 for accommodation by the mouth 8 of the animal.

The first and second tube portions 24, 28 may be formed as an integral unit, or formed separately and assembled together. They may comprise metal, such as stainless steel, or a suitable plastics material.

Figure 2:
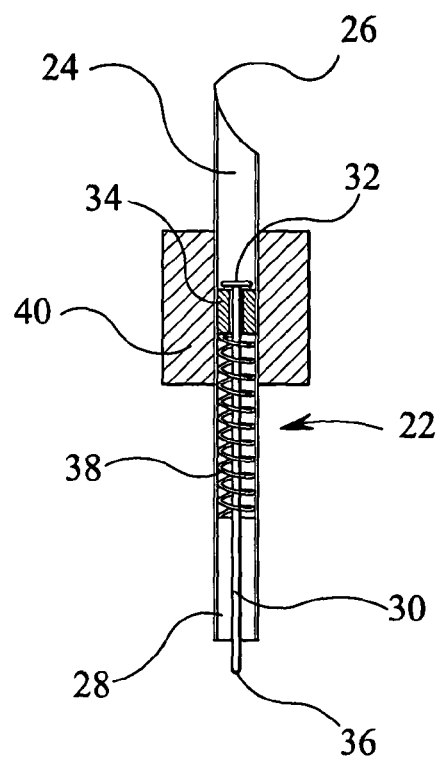
FIG. 2 is a cross-sectional view of the valve arrangement of FIG. 1.

As shown in FIG. 2, the valve arrangement 22 incorporates a valve means, which suitably comprises a pin 30, such as of stainless steel, having a head portion 32 engaging an apertured seal 34, such as of rubber. The pin 30 has an end 36 extending from the second tube portion 28 of the valve means 22 and adapted to be contacted by the mouth 8 of the animal to raise the head portion 32 from the seal 34, against force of a spring 38, which suitably comprises stainless steel. The valve means is thereby opened to permit flow of liquid through it.

The valve arrangement 22 is provided with a finger grip arrangement 40.

Figure 3:
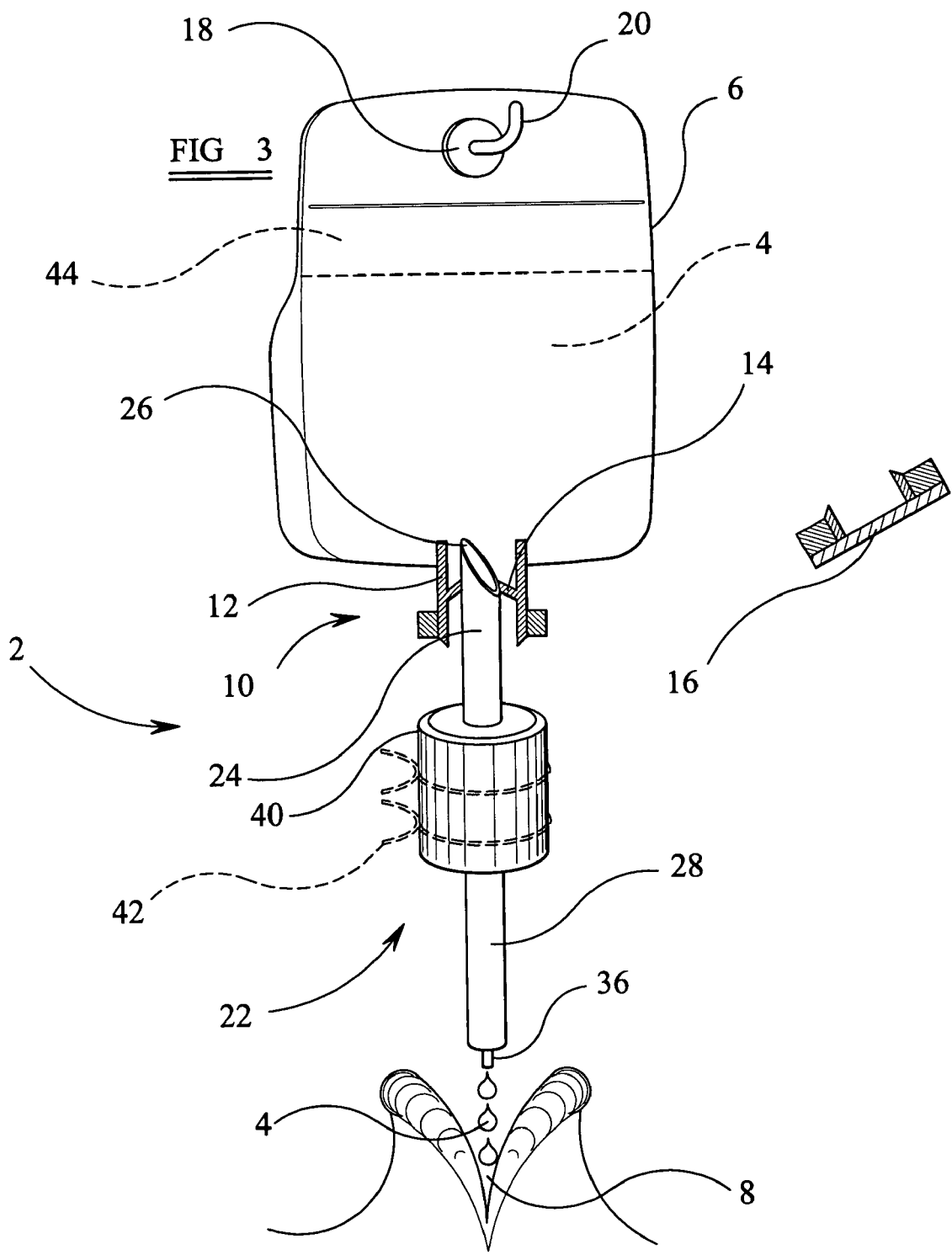
FIG. 3 is a perspective view of the container with liquid and the valve arrangement of FIG. 1, after assembly.

Referring now to FIG. 3, the cap 16 on the seal means 1 is removed and the valve arrangement 22 is fitted to the container 6 by holding the finger grip arrangement 40 and piercing the membrane or septum 14 of the seal means 10 by pushing through it the sharply angled or pointed region 26 at the end of the first tube portion 24. The first tube portion 24 forms a sealed interference fit in the hole formed by piercing the membrane or septum 14 and such that no leakage of liquid 4 occurs between the membrane or septum 14 and an exterior of the first tube portion 24.

The valve arrangement 22 is suitably secured directly or indirectly to a structure, such as a cage associated with the animal. Such securing may simply comprise the support means 20 of the container 6. However, one or more other arrangements, such as clips 42, may be used to secure the valve arrangement 22.

When the mouth 8 of the animal contacts the end 36 of the pin 30 of the valve means, to open the valve means, liquid 4 is dispensed from the container 6 through the valve arrangement 22 and into the mouth 8 of the animal. Such flow of liquid 4 continues until contact by the animal with the end 36 of the pin 30 ceases. As the liquid 4 is drawn from the container 6, the flexible nature of the material of the container 6 allows the container to collapse under atmospheric pressure, as denoted by reference numeral 44. As a result, no vacuum is created inside the container 6 and any tendency for contaminants, such as air, or liquid or food debris from the mouth 8 of the animal, to be drawn back into the container 6, is minimised. Thus the liquid 4 in the container remains fresh at all times and can be completely used with safety.

The first tube portion 24 may be coaxially linearly aligned with the second tube portion 28, or may be arranged at an angle thereto as denoted by the dotted outline in FIG. 1.

Figure 4:
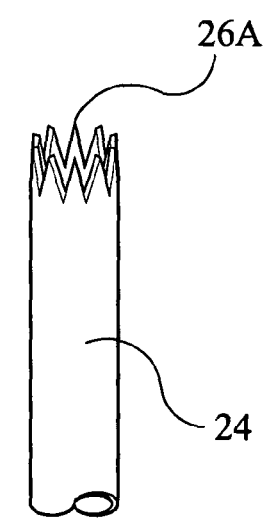
FIG. 4 is a perspective view of an alternative embodiment of a first tube portion of the valve arrangement of FIG. 1.

Instead of the end of the first tube portion 24 of the valve arrangement 22 having a single sharply angled or pointed region 26, it could be provided with a plurality of angled or pointed regions 26A, as shown in FIG. 4.

The finger grip arrangement 40, which is suitably concentrically arranged on the valve arrangement 22, may comprise two threadedly-engaging portions 40A, 40B, of cap or ferrule form, as shown in FIGS. 5 and 6. The portions 40A and 40B can be disengaged from one another to separate into two component parts. One of the component parts can be arranged at one side of a support 48 and the other component part can be arranged at the other side of the support 48 with the valve arrangement 22 passing through the component parts 40A and 40B and through an aperture 46 in the support 48. Such support 48 may be a portion of a cage for containing the animal, or a bracket or cradle, such as for securing to the cage.

The valve arrangement 22 is suitably dimensioned to suit the size and drinking requirements of the animal. The valve arrangement 22 shown in FIGS. 1 to 6 is of small size and is particularly suited to small animals, such as mice and rats, with small mouths and requiring low rates of flow and/or volume of the liquid 4. Larger animals, such as rabbits and primates, have larger mouths and also may require higher rates of flow and/or volume of the liquid 4. To meet such requirements a valve arrangement 22 such as shown in FIG. 7 can be provided, having a larger second tube portion 28 incorporating larger internal valve means 32, 34. Such larger second tube portion 28 is suitably threaded at a region 50 onto a component 52 incorporating the first tube portion 24. Again, a support (not shown) can be provided between the two threaded portions.

Alternative forms of valve means within the valve arrangement to that described hereinbefore may be used in a valve arrangement and an assembly according to the present invention. For example, a non-return valve of a type known to a person skilled in the art may be used which is activated by an animal and is adapted to permit flow of the liquid through the valve arrangement from the container towards the animal but to detect and prevent any flow of the liquid from the animal back to the container, thus preventing potentially contaminated liquid and entrained air entering the container.

Although the bag-form container is described as being formed of a flexible plastics material, it should be appreciated that other flexible materials, for example rubber, treated paper and cardboard, cloth or fibre materials, could be used to produce a sealed container such that as liquid is removed therefrom, the container collapses under atmospheric pressure.

Although the container has been described as a bag-form which is collapsable in use, it should be appreciated that other forms of container may be used. For example, as shown in FIG. 8, a container 54 formed from a rigid material, for example a plastics material, could be used where the container is provided with a pleated surface 56. As shown in FIG. 9 the pleated surface allows adjacent portions of the container to move towards each other under atmospheric pressure, thus reducing the internal volume of the container. As a result, no vacuum is created inside the container 54 and any tendency for contaminants, such as air, or liquid or food debris from the mouth of the animal, to be drawn back into the container 54 is minimised.

Alternatively, as shown in FIG. 10, a rigid container 58, could be used which is provided with a filtered vent 60, preferably incorporating a Hepa filter-as known to a person skilled in the art, such that any vacuum created inside the container is relieved.

Hereinbefore the first tube portion 24 has been described as piercing a seal means in the form of a septum in the container. It should be understood that an assembly in accordance with the present invention could comprise any suitable portion of a container, for example a wall of a coated cardboard container, which could be pierced by the first tube portion.

Although the first tube portion 24 has been described as forming a sealed interference fit with the pierced portion of the container, it should be appreciated that an assembly in accordance with the present invention could comprise alternative means, known to a person skilled in the art, for producing a water-tight fit and thus preventing leakage of liquid between the pierced portion of the container and the exterior of the first tube portion.

The finger grip arrangement has been described as comprising two threadedly-engaging portions 40A, 40B, of cap or ferrule form which can be arranged either side of a support to position the valve arrangement in relation to a cage containing an animal. It should be appreciated that alternative means for positioning the valve arrangement relative to the cage could be used. For example, a grommet, such as of rubber or plastics material, could be secured to the valve arrangement by means of washers, such as star washers. The grommet is adapted to form a seal with an aperture in a support, for example a portion of the cage or a bracket secured to the cage with the valve arrangement passing through the grommet and the aperture.

I claim:

1. An assembly for dispensing a liquid from a container to a mouth of an animal, on demand of the animal comprising a container at least partially filled with the liquid, the container including a connecting tube extending from the container, the connecting tube containing a seal means therein in the form of a membrane; and a valve arrangement fitted thereto, the valve arrangement comprising a first tube portion piercing the membrane of the seal means of the container to receive the liquid from the container, a second tube portion provided with an end adapted to be used by the animal, and a valve means adapted to be actuated by the animal to permit the flow of the liquid from the container to the end of the second tube portion.

2. The assembly of claim 1, wherein the container is of rigid form comprising a filtered vent to relieve a vacuum created within the container as the liquid is dispensed therefrom to the animal.

3. The assembly of claim 2, wherein the filtered vent comprises a Hepa filter.

4. The assembly of claim 1, wherein the container is arranged to collapse under atmospheric pressure as the liquid is dispensed therefrom to the animal.

5. The assembly of claim 4, wherein the container comprises a rigid material provided with a pleated surface.

6. The assembly of claim 4, wherein the container is of bag-form comprising a flexible material.

7. The assembly of claim 1, wherein container comprises a material selected from a plastics material, rubber, treated paper and cardboard, cloth and fibre materials.

8. The assembly of claim 1, wherein the container is hermetically sealed.

9. The assembly of claim 1, wherein the container is provided within an outer wrapping to maintain sterility of the container prior to use.

10. The assembly of claim 1, wherein the container comprises a material selected so as to be capable of being sterilised.

11. The assembly of claim 1, wherein the container is provided with means for suspending it from suitable support means.

12. The assembly of claim 1, wherein the membrane of the seal means of the container pierced by the first tube portion of the valve arrangement is arranged to be pierced without leakage of the liquid occurring between the pierced membrane of the container and an exterior of the first tube portion, the first tube portion forming a water-tight fit in the pierced membrane of the container.

13. The assembly of claim 1, wherein the seal means is covered by a removable cap until access thereto for piercing is required.

14. The assembly of claim 1, wherein the valve arrangement is arranged to be fitted to the container and the container arranged to be secured to a structure.

15. An assembly as claimed in claim 1, wherein the container is arranged to be secured to a structure associated with the animal.

16. An assembly as claimed in claim 1, wherein the valve arrangement is adapted to be secured to a structure, associated with the animal, by means selected from a clip, a ferrule, a threaded cap, a grommet, a washer, a bracket and a cradle.

17. An assembly as claimed in claim 1, wherein a finger grip arrangement is provided on the valve arrangement to facilitate fitting of the valve arrangement to the container.

18. An assembly as claimed in claim 1, wherein the first tube portion of the valve arrangement has an end thereof shaped to form at least one sharply angled region, which sharply angled region facilitates piercing of the membrane of the seal means of the container by the first tube portion.

19. An assembly as claimed in claim 1, wherein the valve means comprises a non-return valve actuated by the animal and adapted to permit flow of the liquid through the valve arrangement from the container towards the animal but to prevent any flow of the liquid from the animal to the container.

* * * * *